United States Patent [19]

Takata

[11] Patent Number: 5,018,797
[45] Date of Patent: May 28, 1991

[54] FLUID PRESSURE CONTROLLER

[75] Inventor: Koji Takata, Itami, Japan

[73] Assignee: Sumitomo Electric Industries, Ltd., Osaka, Japan

[21] Appl. No.: 435,836

[22] Filed: Nov. 14, 1989

[30] Foreign Application Priority Data

Nov. 14, 1988 [JP] Japan .................. 63-288085
May 19, 1989 [JP] Japan .................. 1-127545
Jun. 16, 1989 [JP] Japan .................. 1-154869

[51] Int. Cl.$^5$ .................................. B60T 8/36
[52] U.S. Cl. ........................ 303/117; 251/129.15; 303/119
[58] Field of Search ............ 188/181 A; 137/593, 137/596.16, 825, 827, 831, 832; 251/129.07, 129.15; 303/113, 115, 117, 119

[56] References Cited

U.S. PATENT DOCUMENTS

| | | | |
|---|---|---|---|
| 2,877,795 | 3/1959 | Cocklin ............ | 251/129.15 X |
| 3,820,856 | 6/1974 | Adahan ............ | 303/117 |
| 3,851,930 | 12/1974 | Grosseau ........... | 303/117 |
| 4,561,628 | 12/1985 | Matsushima et al. | 137/596.16 X |
| 4,836,248 | 6/1989 | Stegmaier ......... | 251/129.15 X |

Primary Examiner—Robert J. Oberleitner
Assistant Examiner—Alfred Muratori
Attorney, Agent, or Firm—Wenderoth, Lind & Ponack

[57] ABSTRACT

A fluid pressure controller includes a housing formed with an input port, a discharge port and an output port, a spool axially slidably mounted in a bore provided in the housing, a spring for keeping the spool in its inoperative position, and an electricity/power converter for imparting to the spool an axial driving force corresponding to the amplitude of an electric signal applied to the converter. First and second chambers are defined by the inner peripheral surface of the bore and both end faces of the spool. The spool is formed with an internal passage connecting the first and second chambers together and having its intermediate portion throttled to form a fixed-size orifice and with a peripheral channel at a point between the first chamber and the fixed-size orifice so as to communicate with the internal passage. The output port normally communicates with the second chamber. The spool is movable among a first position where the peripheral channel communicates with the input port, a second position where it is shut off from both the input port and the output port and a third position where it communicates with the discharge port. Thus when the output port is brought into communication with either the input port or the discharge port through the peripheral channel, hydraulic fluid will flow through the fixed-size orifice, thereby creating a pressure difference at both ends of the orifice, the pressure difference being equal to the output of the converter minus the biasing force of the spring.

12 Claims, 3 Drawing Sheets

FLUID PRESSURE CONTROLLER

The present invention relates to a fluid pressure controller for controlling the rate of rise and fall (flow rate to be exact) of fluid pressure.

The fluid pressure controller according to the present invention is applicable to any type of hydraulic system which requires to control the pressure and flow rate of fluid. But since its effect is most remarkable when used to control the fluid pressure electronically in the brake system of a vehicle, the following description is on the assumption that the controller is used with a brake system, specifically a brake system with antilock control.

The electronically controlled brake system such as an antilock device is usually provided with solenoid valves used as a fluid pressure controller.

The rate of rise and fall of pressure (flow rate) attained by a solenoid valve tends to fluctuate with the voltage applied, temperature, input pressure and output pressure, even if the duration of pressure increase or pressure reduction command (valve-opening or valve-closing command) is constant. The solenoid valve itself cannot detect such fluctuations and feed them back. For precise control, it would be necessary to provide means for detecting and correcting fluctuations of rising and falling rate of pressure. An obvious solution to this problem would be to provide sensors and correct such fluctuations based on the signals from the sensors. In fact, such ideas have already been disclosed in some patent applications. But this solution will bring about an increase in the cost of the entire system.

The lower the amount of rise or fall of pressure per command, the more delicately the fluid flow can be controlled. But if the controlled amount per command is too small, the fluid pressure might not rise or fall at all in adverse conditions owing to the abovementioned variable factors. This will limit the minimum amount of rise or fall of pressure per single command.

An object of the present invention is to provide a brake fluid pressure controller having higher responsiveness and controllability.

According to the present invention, there is provided a fluid pressure controller comprising a housing formed with an input port, a discharge port and an output port and a spool slidably mounted in a bore provided in the housing. A first chamber and a second chamber are defined in the bore by both end faces of the spool, the second chamber communicating with the output port. The spool is formed with an internal passage connecting the first and second chambers together and having its intermediate portion throttled to form a fixed-size orifice and formed with a peripheral channel disposed at a point between the first chamber and the fixed-size orifice so as to communicate with the internal passage. A spring is provided to keep the spool in its initial position.

An electricity/power converter is provided to impart to the spool an axial driving force corresponding to the amplitude of an electric signal supplied to it, so that the spool is movable among a position for pressure increase (hereinafter referred to as a first position) where the peripheral channel communicates with the input port, a position for pressure decrease (hereinafter referred to as a third position) where it communicates with the discharge port, and a neutral position (hereinafter referred to as a second position) where it communicates with neither the input port nor the discharge port.

The spool is to be regarded as located in the first position if the input port is fully open or if a variable-size orifice is formed between the input port and the peripheral channel. This is true with the third position where the discharge port is open.

The initial position of the spool, i.e. the position of the spool where the output of the electricity/power converter is zero may be determined by changing the arrangement of a spring so as to coincide with any of the first, second and third positions. If the initial position coincides with the second position, the spool should be adapted to be moved from the second position toward the first position with one of two outputs (plus and minus) of the electricity/power converter and to be moved from the second position toward the third position with the other output. If the initial position coincides with the first or third position, the output of the converter should be controlled so as to balance with the biasing force of the spring when its amplitude is on a mid-level, so that the position of the spool can be adjusted by increasing or decreasing the output of the converter.

The pressure controller may be further provided with a bypass for directly connecting the input port and the output port together at the first position to increase the fluid pressure or with a bypass for directly connecting the discharge port and the output port together at the third position to decrease the fluid pressure Further either the input port or the discharge port may be omitted so that the pressure controller will be used only for pressure increase or pressure reduction.

According to the present invention, the controller can automatically and mechanically control the fluid flow so that the flow rate of fluid, which is equal to the rising or falling rate of pressure if the stiffness of the fluid system is assumed to be constant, will change directly in response to the electric signals. This is for the following reasons.

The fluid in the line between the input port and the output port or between the output port and the discharge port moves through the fixed-size orifice in the spool every time a command to increase or decrease the pressure is given. This will create a pressure difference at both ends of the fixed-size orifice. The flow rate through the fixed-size orifice is determined by this pressure difference, which is in turn determined by the balance between the biasing force of the spring and the driving force of the electricity/power converter. The spool is adapted to move back and forth t automatically adjust the size of the variable-size orifice defined between the peripheral channel in the spool and the input port or the discharge port formed in the housing in such a manner that the pressure difference is kept at a required level. Since the flow rate of the fluid being fed toward or from the brakes is controlled to exactly follow the amplitude of the electric signals, the output pressure is less likely to overshoot and fluctuate compared with a prior art controller in which the output pressure itself is controlled by the electric signal.

According to the present invention, the input pressure and the output pressure have little influence on the rate of rise and fall of fluid pressure.

With an ordinary hydraulic circuit, the influence of temperature can be reduced to such a level as to cause no practical problem, if the orifice in the spool is in the shape of a thin edge.

Speaking of the influence of the supply voltage and the temperature in the electric circuit, most of the conventional electricity/power converter are actually electric current/power converter.

Therefore, this problem can be solved if the electronic control unit is of a type which controls not a voltage but a current (e.g. of a type capable of controlling the effective current by pulse width modulation (PWM) method). Thus, all the factors which can cause fluctuations of the rising and falling rate of pressure can be excluded except the stiffness properties of the fluid system (i.e. brake cylinders, hoses, etc.)

The fluid pressure controller according to the present invention is especially suited for use with wheel brakes wherein the responsiveness and controllability are the most important factors, but it can also be used as a compact flow control valve for any other hydraulic device in general (specifically of a type in which the feed rate of pressure fluid to a pressurizing device (such as a cylinder) is in a certain relation with the rising rate of pressure prevailing in that device, because of its excellent responsiveness and controllability.

Other features and objects of the present invention will become apparent from the following description taken with reference to the accompanying drawings, in which.

Figure 1:
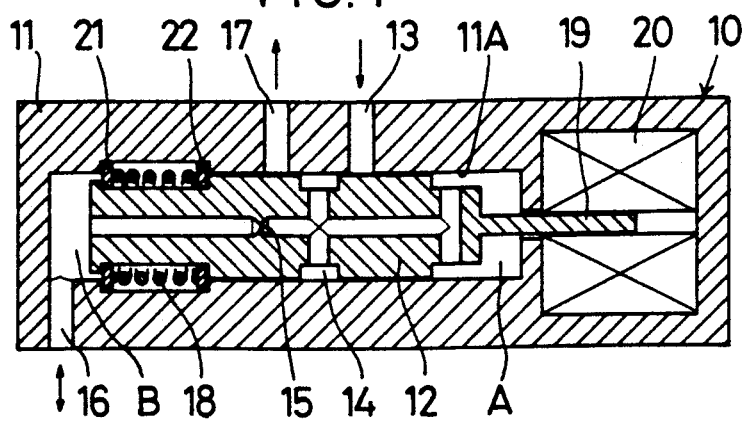
FIG. 1 is a sectional view of the first embodiment of the fluid pressure controller according to the present invention.

FIG. 1 shows the first embodiment in which a fluid pressure control device 10 comprises a housing 11 and a spool 12 axially slidably mounted in a bore 11A provided in the housing 11. The bore 11A has first and second chambers A and B at both ends of the spool 12. The spool is formed with an internal passage including a fixed-size orifice 15 to communicate both chambers A and B together and is also formed with a peripheral channel 14 which communicates with the internal passage at a point between the chamber A and the orifice 15. The bore 11A may be formed directly in the housing 11 or a suitable sleeve having a bore 11A may be inserted in the housing.

A spring 18 is interposed between washers 21 and 22. With no external forces, the spool 12 will remain in its neutral or second position as shown in FIG. 1.

If the spool 12 is moved to the righthand side from the position shown in FIG. 1, the biasing force of the spring 18 will act on the spool 12 through the washer 21 to bias it leftwardly. If it is moved to the lefthand side, the biasing force of the spring 18 will act on the spool 12 through the washer 22 to bias it rightwardly. The spring 18 should have a sufficient biasing force to allow the spool 12 to be pushed back to its neutral position against the frictional resistance when it is not subjected to any external force.

An electricity/power converter 20 is provided to move the spool in either direction against the biasing force of the spring 18. The converter 20 employed in this embodiment is of the type in which a spool driver 19 is moved to right or left by applying a positive or negative current (voltage) to a coil. No driving force acts on the driver 19 when the applied current (voltage) is zero.

There are known various kinds of electricity/power converters such as ones comprising a combination of a coil and a permanent magnet, a combination of a coil and an electromagnet, a combination of a permanent magnet and an electromagnet, and a combination of electromagnet and iron core. The converter 20 according to the present invention should be of the type in which its output is less liable to fluctuate with the stroke of the driver.

Suppose that a positive current (voltage) is applied to the electricity/power converter 20 in response to a pressure increase command and as a result the spool 21 is moved to the righthand side, thus bringing an input port 13 into communication with the peripheral channel 14. Then the fluid supplied to the input port 13 will flow into the internal passage from right to left through the fixed-size orifice 15 at a rate determined by the pressure difference at both ends of the orifice 15. The opening defined by the relative position of the input port 13 and the peripheral channel 14 serves as a variable-size orifice because its aperture changes as the spool 12 slides in the bore 11A.

The pressure difference at both ends of the orifice 15 is influenced by the opening of this variable-size orifice. If the spool 12 moves rightwardly to increase the opening of the variable-size orifice, the pressure at the righthand side of the fixed-size orifice will increase, thus generating such a force as to push the spool 12 back to the lefthand side. If the spool moves leftwardly and the opening of the variable-size orifice decreases, the flow rate through the variable-size orifice will drop below that through the fixed-size orifice 15, thus allowing the spool to move rightwardly under the force of the electricity/power converter.

By this automatic equibrium-seeking action, the difference in fluid pressure at both sides of the fixed-size orifice 15 multiplied by the sectional area of the spool 12 is kept equal to the difference between the output of the electricity/power converter 20 and the biasing force of the spring 18. In other words, the flow rate through the fixed-size orifice 15 corresponds to (theoretically not proportional to) the pressure difference at both sides of the orifice 15 and thus corresponds to the difference between the output of the electricity/power converter 20 and the biasing force of the spring 18 divided by the sectional area of the spool 12.

If the output of the electricity/power converter 20 turns to zero in response to a pressure hold command, the spool 12 will be biased by the spring to move back to its neutral position shown in FIG. 1. In this state, an output port 16 is shut off from both the input port 13 and a discharge port 17.

If a negative current (voltage) is applied to the electricity/power converter 20 in response to a pressure reduction command, the spool 12 will move leftwardly, thus forming a variable-size opening or orifice between the discharge port 17 and the peripheral channel 14. Thus the fluid pressure at the lefthand side of the fixed-size orifice 15 will get higher than that at its right. This will reverse the direction of fluid flow through the fixed-size orifice so as to reduce the fluid pressure at the output side. The spool 12 will balance at a predetermined point on the same principle as described above.

The electricity/power converter 20 may be connected in an opposite way to the connection shown in the embodiment so that the fluid pressure will fall at the positive command and rise at the negative command.

In this embodiment, the pressure controller can be used both for pressure increase and pressure reduction. If only one of the pressure increase and pressure reduction functions is required, one of the input port 13 and the discharge port 17 may be omitted so as to drive the spool 12 only in one direction with the electricity/power converter 20. This applies to the second embodiment, too.

Figure 2:
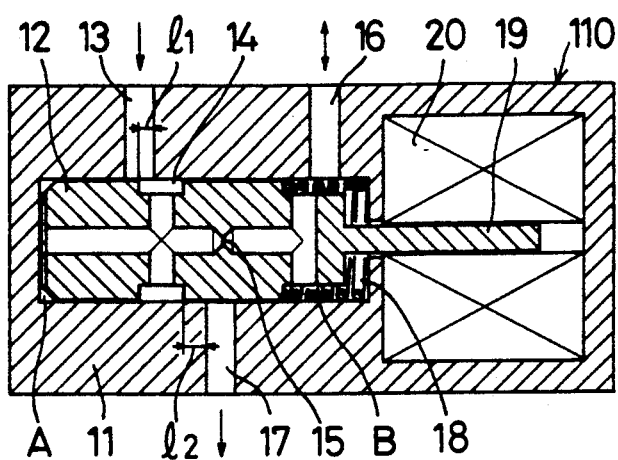
FIGS. 2 and 3 are sectional views of the second embodiment.
Figure 3:
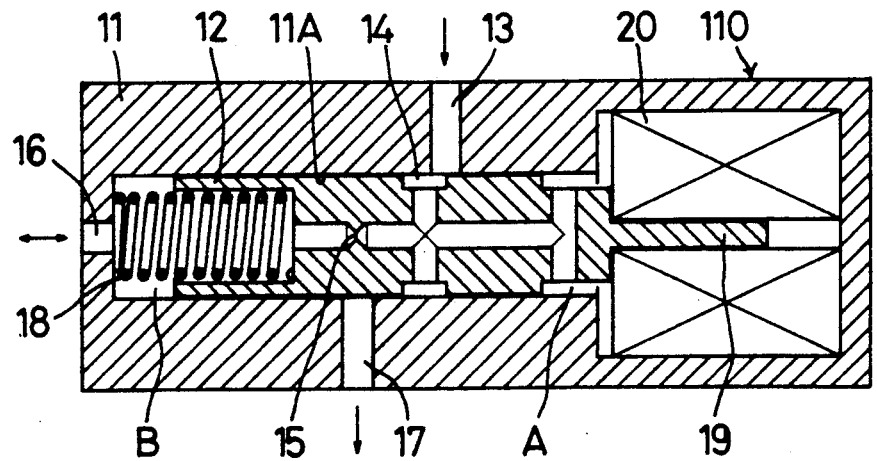

FIGS. 2 and 3 show the second embodiment.

In the first embodiment, the fluid pressure is changed over among pressure increase—pressure hold—pressure reduction as the electric signal changes over among three positions, i.e. $+(-) \leftarrow \rightarrow 0 \leftarrow \rightarrow -(+)$. But, depending upon application or the circuit arrangement of a brake system, the fluid pressure is required to change among pressure increase—pressure hold—pressure reduction as the electric signal changes between 0 and maximum.

For this purpose, with a fluid pressure controller 110 in the second embodiment, its spool 12 is adapted to be located in its initial or first position shown in FIG. 2 when the electric signal given to the electricity/power converter 20 is zero. In this state, the discharge port 17 is closed and the input port 13 is open. When the electric signal is changed to a middle level, the spool 12 will move to a second position in which both the input port and the discharge port are closed. As the electric signal increases further from this level, the spool will move to a third position where the input port is kept closed and the discharge port is opened. It is necessary that the distance $l_2$ be longer than the distance $l_1$ in order for the spool to take its neutral or second position.

The electricity/power converter 20 may be of a type which pulls in the driver 19 as shown in FIG. 2 or of a type which pushes out the driver 19 as shown in FIG. 3. Although the controllers in FIGS. 2 and 3 differ from each other in that the respective springs are mounted in opposite ways to each other and in that the positional relations between the ports 13, 17 and 16 and the converter 20 are opposite to each other, they are the same in function. In either of the arrangements, the fluid pressure is increased and decreased on the same principle as in the first embodiment.

Figure 4:
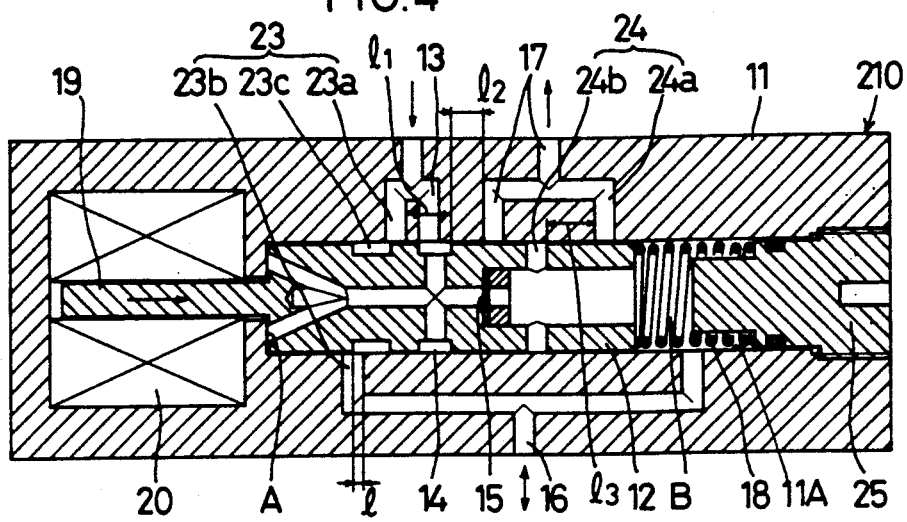
FIGS. 4 and 5 are sectional views of the third embodiment.
Figure 5:
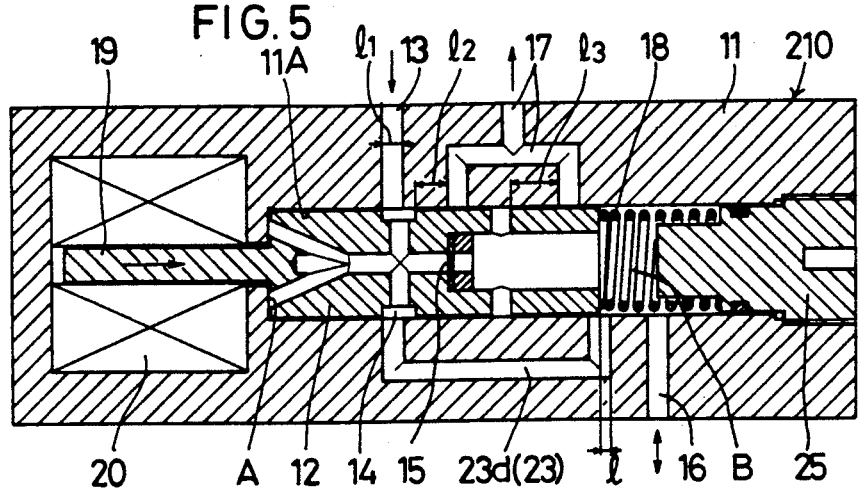

FIGS. 4 and 5 show the third embodiment.

If the controller according to the present invention is applied to an electronically controlled brake system, it is required to be capable of passing fluid at a particularly high rate in order to increase the braking pressure quickly during a normal braking mode where no control mode (antilock control mode in this embodiment) sets in.

But it would be difficult to attain such a high flow rate (rising rate of pressure) with the controllers in the aforementioned embodiments because they have a fixed-size orifice through which fluid flows.

To reduce the output pressure during antilock control, the discharge port is opened. But because of the presence of the fixed-size orifice, the flow rate tends to drop as the pressure drops beyond a limit. This will in turn slow down the pressure decreasing rate. In other words, a drop in the pressure itself beyond a limit brings about a slowdown in the descending rate of pressure.

For accurate antilock control, the controller is required to be capable of reducing the output pressure at a sufficiently high rate even if it has already dropped to a rather low level. This object can be fulfilled by increasing the diameter of the fixed-size orifice But this will worsen the controllability of pressure during normal braking control, especially when the flow rate is low.

A fluid pressure controller 210 in the third embodiment is of a type in which the initial position corresponds to the first position and is provided with a bypass channel 23 which serves to bring the input port 13 and the output port 16 into direct communication with each other without the restriction of the fixed-size orifice when the spool 12 is in the initial position and cut off communication therebetween when the spool moves by a distance $l(l<l_1)$ from the initial position toward the second position.

While the output of the electricity/power converter 20 is zero, the bypass channel 23 is kept open, thereby keeping the pressure difference at both ends of the fixed-size orifice 15 at substantially zero (which means that the flow rate through the orifice is also substantially zero because the flow rate is in proportion to the square root of the pressure difference). In this state, the spool 12 is biased by the spring 18 so as to be kept in the initial position, so that the fluid flows directly from the input port 13 to the output port 16 until the electricity/power converter 20 begins to produce output. Since the fluid does not flow through the fixed-size orifice in this state, the output pressure can be increased and decreased freely.

When the antilock control begins, the bypass channel 23 will close and the fluid will flow through the fixed-size orifice. Although the maximum flow velocity through the orifice is not very high, the output pressure can be controlled accurately owing to the above-described characteristics of the variable-flow control. In this regard, the controller in the third embodiment, which is of a variable-flow type, can be looked upon as an modification of the prior art fixed-flow control valve formed with a bypass (Japanese Patent Application 63-135041) in which the hydraulic fluid flows through a wide bypass before starting a control mode and after starting the control mode, the fluid flows through a restricted channel in a controlled manner.

The bypass channel 23 may consist of passages 23a and 23b formed in the housing and a groove 23c formed in the periphery of the spool as shown in FIG. 4. Otherwise as shown in FIG. 5, it may consist of a passage 23d formed in the housing 11 and adapted to bring the input port 13 and the second chamber B into communication with each other and cut off the communication therebetween when the spool 12 moves the distance l from the initial position. The latter arrangement is simpler in construction.

Further, in this embodiment, a bypass channel 24 (FIG. 4) for use in pressure reduction is formed in the housing so as to cut off communication between the discharge port 17 and the output port 16 while the spool movement from the initial position toward the second chamber B has not reached the distance $l_3 (>l_2)$ and to establish direct communication therebetween when the spool has moved beyond the distance $l_3$. The provision of the bypass channel 24 serves to improve the pressure controllability while the output fluid pressure is near zero during the pressure reduction phase.

The bypass 24 for pressure reduction consists of a passage 24a formed in the housing and a passage 24b formed in the spool. It is kept closed while the variable-size orifice is formed between the peripheral channel 14 in the spool and the discharge port 17 to allow the fluid to flow through the fixed-size orifice and thus to reduce the output pressure. When the output pressure drops below a value which corresponds to the difference between the driving force of the electricity/power converter 20 and the biasing force of the spring 18, that is, a pressure value necessary to drop the pressure at a desired rate, the pressure difference at both ends of the spool will get too low to compensate for the abovementioned difference, assuming the pressure at the discharge port to be zero. This will cause the spool 12 to move rightwardly, thus opening the bypass channel 24 for direct pressure reduction.

The output pressure will now decrease to zero swiftly because the output port and the discharge port are connected together not through the fixed-size orifice 15 but through the bypass channel 24. This state continues until the output of the electricity/power converter 20 is reduced below the biasing force of the spring 18, i.e. until the electric signal to the converter 20 becomes from pressure decrease to pressure increase or pressure hold.

In this embodiment, the spring 18 has its one end supported on an adjusting screw 25 inserted in the housing 11. The screw 25 is adjusted to balance the biasing force of the spring 18 with the output of the electricity/power converter 20 so that the spool 12 is kept in such a position that the peripheral channel 14 is not in communication with both the input port 13 or the discharge port 17 (second position) while the pressure hold command is being given. In other words, the biasing force of the spring 18 is adjusted within a range given by its spring constant multiplied by the difference between the distances $l_2$ and $l_1$.

The biasing force of the spring may be adjusted by interposing a shim selected according to the spring used between the spring and the housing or between the spring and the spool 12. Instead of adjusting the biasing force of the spring, the output of the electricity/power converter 20 may be adjusted e.g. by adding a resistor or changing the resistance of the resistor or by adjusting a variable resistor.

If the controller 210 is used in combination with a single specific electronic control unit for giving electric signals to the converter 20, the above adjustment can be done by adjusting the constants in the electronic control unit before delivery (by use of e.g. a programmable ROM (PROM) or an electrically erasable programmable ROM (EEPROM) ). But since the controller is usually required to be combined with any electronic control unit, this method is not practical.

If it is impossible to adjust the constants before delivery, the electronic control unit may have the function of learning and memorizing suitable values by judging control conditions during practical use. If the system to be controlled is provided with pressure sensors, it would not be difficult to learn suitable correction values But if the system does not include any pressure sensors (most brake systems for automobiles do not have pressure sensors due to economical restrictions), the electronic control unit has to have the function of estimating the results of control by comparing the estimated effect with the actual results. If the difference therebetween exceeds a certain point, the values to be adjusted are corrected gradually to decrease the difference and the values thus renewed are memorized. The initial values at the time of delivery should be set to such values as to approximately correspond to the mean value of manufacturing errors so as to attain an optimum value with the smallest number of corrections.

Such balance adjusting methods may be employed in the first and second embodiments.

The controller in the third embodiment can be modified so as to be used only for increasing pressure or only for reducing pressure simply by omitting the passages 17 and 24 or the passages 13 and 23, respectively.

Figure 6:
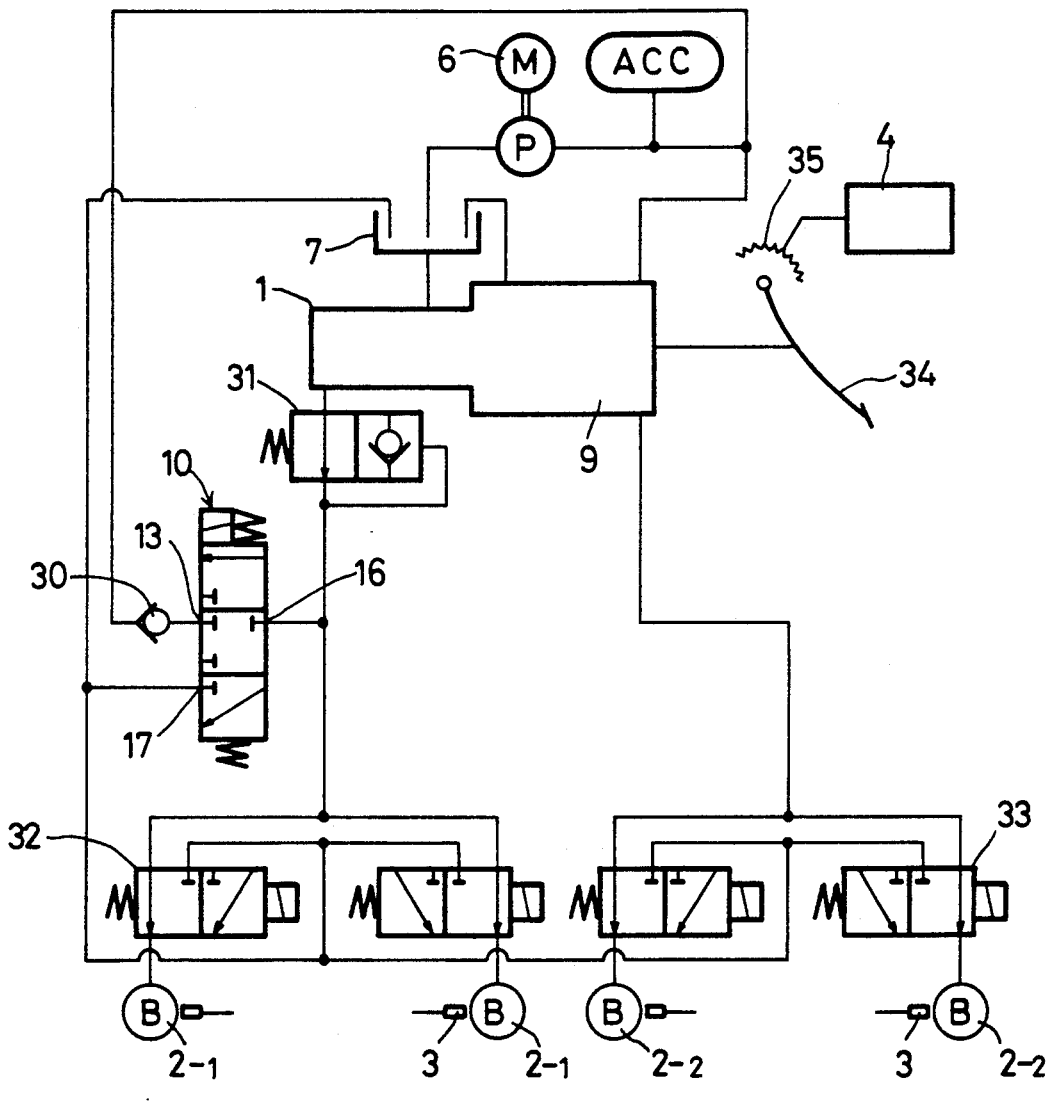
FIG. 6 is a circuit diagram of an example of the brake system provided with the fluid pressure controller of the first embodiment.

FIG. 6 shows an entire brake system provided with the fluid pressure controller 10 accordingt to the present invention. This brake system was proposed by the applicant in Japanese Patent Application 1-85176. With this brake system, the pressure in the static pressure line can recover quickly after subjected to a drop in pressure owing to antilock control Another advantage of this system is that it can give a better pedal feeling to the driver. The fluid pressure produced in a master cylinder 1 (static pressure) and the fluid pressure pressure produced in a pressure source 6 (dynamic pressure), which is supplied through a booster 9, are applied to brakes 2-1 and 2-2 through two lines to brake the wheels.

The static pressure and the dynamic pressure may be applied through two lines separately from each other as illustrated in FIG. 6. Alternatively, only the static pressure may be distributed through the two lines by means of a tandem master cylinder so as to use the dynamic pressure only to amplify the manual force. The pressure controller 10 is provided in a line extending from the pressure source 6 to an intermediate portion of the static pressure line.

Though its internal structure is not shown, the booster 9 comprises a push rod associated with a brake pedal 34, a dynamic pressure piston for exerting fluid pressure in a dynamic pressure chamber, and a pure mechanical valve assembly adapted to move the push rod and the dynamic pressure piston relative to each other to change over the communication among the dynamic pressure source 6, a reservoir 7 and the dynamic pressure chamber and thus to produce pressure (dynamic pressure) proportional to the pressure put on the brake pedal when the system is working normally. The dynamic pressure in the dynamic pressure chamber, having been adjusted to a desired level, is transmitted as a reaction force to the pedal 34 through the push rod on the one hand and to the dynamic pressure piston on the other hand. Since the master cylinder piston is adapted to move in unison with the dynamic pressure piston, static pressure will be produced in the master cylinder 1 when the dynamic pressure piston is pushed under the influence of the dynamic pressure. The static pressure thus produced will be applied to the brakes 2-1 whereas the dynamic pressure is applied through the booster 9 to the brakes 2-2.

If the dynamic pressure line fails, the dynamic pressure in the dynamic pressure chamber, which acts as a reaction force to the pedal, will disappear, thus bringing the push rod into direct contact with the dynamic pressure piston. Now the pressure on the pedal will be directly applied to the master cylinder.

This brake system is provided with a detector 35 for detecting the position of the pedal 34. The pedal position signal is supplied to an electronic control unit 4, which calculates the deceleration of the vehicle based on the information supplied from wheel speed sensors 3 (or based on the information from a vehicle acceleration/deceleration sensor) and gives an operating command to the controller 10 so that the pedal position and the vehicle deceleration will be in a predetermined relation with each other. In response to the operating command, the controller 10 will admit a required amount of hydraulic fluid into the static pressure line from the dynamic pressure source 6 or drain the hydraulic fluid in the static pressure line into the reservoir 7.

Though the hydraulic fluid in the static line is reduced during pressure reduction phase in antilock control, it is replenished by introducing the fluid from the dynamic pressure source through the controller 10 in response to the operating command. If it is judged that the deceleration is insufficient compared with the stroke of the pedal, the system will operate in one of the following three ways, depending upon the pressure applied to the pedal by the driver: Namely, the dynamic pressure source is brought into communication with the static pressure line through the controller 10 to increase the braking pressure in the dynamic pressure line as well as the static pressure line and thus to increase the deceleration; the pedal is pushed back by the reaction force; and both happens simultaneously.

If it is judged that the deceleration is too large compared with the stroke of the pedal, the brake system will operate in one of the following three ways, depending on the pressure exerted on the pedal: Namely, the static pressure line is brought into communication with the reservoir through the controller 10 to reduce the braking force and thus the vehicle deceleration; the pedal stroke increases as a result of a decrease in the reaction force on the push rod; and both happens simultaneously. In either case, the pedal stroke and the deceleration are controlled so as to fall into a predetermined relationship with each other.

If the antilock devices 32 have the functions of both reducing pressure during the antilock control and releasing the hydraulic fluid in the static pressure line, the controller 10 may be of a unidirectional type having a discharge port.

If the relation between the pedal stroke and the deceleration fails to return to within a predetermined range in spite of continuously giving a command to open the controller 10 based on the judgement that the pedal stroke is too large compared with the deceleration (or vice versa), or if the relation between the pedal stroke and the deceleration is off the predetermined range beyond a given point, the controller 10 should be forcibly closed, unless a limit switch 31 is in an operative condition (which is not an essential part for the system and which is adapted to be closed if the pressure in the static pressure line exceeds the lowest predetermined pressure in the dynamic pressure source, which is working normally).

The most important feature of the brake system shown in FIG. 6 is the provision of the fluid pressure controller shown in FIG. 1 as a pressure control valve. With this controller, the flow rate therethrough, i.e. the rising or descending speed of pressure can be controlled stably by the electric signals without the fear of being affected by the pressures at the input and output sides. This will improve the reliability of the system.

The fluid pressure controllers in the second and third embodiments may be used as the antilock control devices 32 in the static pressure line and their counterparts 33 in the dynamic pressure line.

Figure 7:
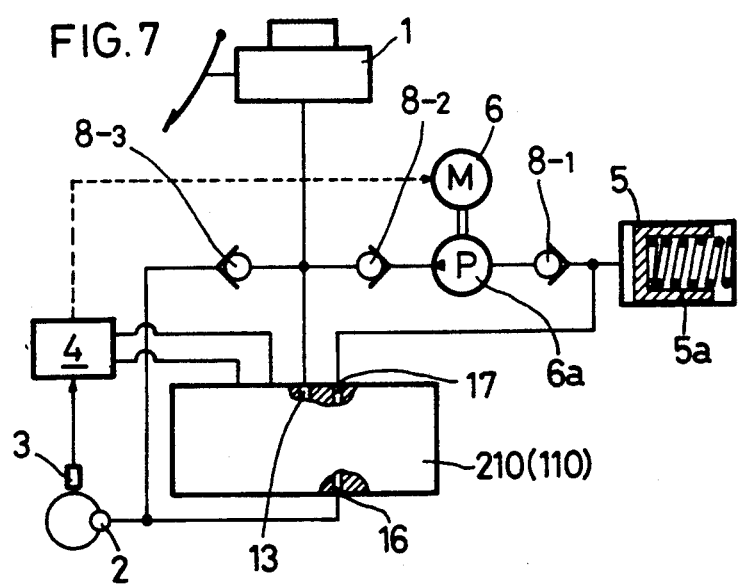
FIG. 7 is a circuit diagram of another example of the brake system provided with the fluid pressure controller of the third embodiment.

FIG. 7 shows a brake system provided with the fluid pressure controller 210 in the third embodiment in which the fluid pressure produced in the master cylinder 1 is applied through the bypass channel 23 (FIGS. 3 and 4) to a brake 2 to brake the wheel. The wheel speed is detected by a wheel speed sensor 3 and the signal representative of the wheel speed is fed to an electronic control unit 4, which judges the behavior of the wheel from the wheel speed signal to give a pressure increase, decrease or hold command if necessary.

If the pressure hold command is given, the electricity/power converter 20 will be activated to move the spool 12 against the biasing force of the spring to the second position. If the pressure reduction command is given, the spool 12 will be moved to the third position to bring the channel 14 and the port 17 into communication with each other, so that the fluid in the brake flows backwards through the output port 16, fixed-size orifice 15 and the discharge port 17 into a low-pressure reservoir 5. The braking pressure will thus drop at a speed corresponding to the amplitude of the electric signal. If the output pressure drops too low to reduce the fluid pressure at a desired speed, the bypass channel 24 for pressure reduction will open to allow the output pressure to plunge toward zero pressure.

The pressure reduction command will activate a motor 6 in the dynamic pressure source to draw the fluid in the reservoir 5 into the line between the master cylinder 1 and the fluid pressure controller by means of a pump 6a.

If the electronic control unit 4 produces the pressure increase command in this state, the spool 12 will be pushed back to the first position, thus bringing the peripheral channel 14 and the port 13 into communication with each other. The system will now operate in an opposite manner to the foregoing to raise the pressure. If the pressure increases to such a level that the difference between the input pressure and the output pressure cannot keep the required difference between the pressures acting on each end of the spool 12, the latter difference will begin to decrease, so that the difference between the biasing force of the spring 18 and the output of the converter 20 exceeds the difference between the pressures acting on both ends of spool.

Thus the spool 12 will be moved to the lefthand side of FIGS. 4 and 5 to open the bypass channel 23 again. Once the bypass channel 23 is opened, the pressure difference at both ends of the spool will disappear, thus keeping open the bypass channel 23 for pressure increase.

The pressure controller 210 may be replaced with the controller 110 in the second embodiment. In that case, a circuit including a solenoid valve adapted to be closed during the antilock control and be opened while the antilock control is inoperative may be provided between the master cylinder and the brake in parallel with the controller 110 so as to permit a rapid pressure increase or reduction.

With the brake system provided with the above-described fluid pressure control valve, if the brake fluid in the master cylinder and the brake line should partially leak into the low-pressure reservoir 5 through a gap existing on the outer periphery of the spool, the brake pedal will move gradually even if the pressure exerted on the pedal is unchanged. In order to give the driver a stable pedal feeling, it is necessary to take some measures to restrain the leakage of fluid to such an extent as not to be noticed by the driver.

It is practically impossible to completely prevent the leakage of brake fluid around the spool especially under high-temperature conditions. If a large pedal force is applied to the pedal repeatedly, the brake fluid accumulated in the low-pressure reservoir might increase gradually, thus reducing the available pressure accumulating capacity of the reservoir. This will make it difficult to reduce the braking pressure from a rather high level to near zero pressure in a very short period of time (the antilock control device is required to control the brake pressure in such a way, if the coefficient of friction between the tire and the road surface drops abruptly while a hard braking is being applied to match the high coefficient of friction.

In order to solve this problem, check valves 8-1 and 8-2 provided in the return circuit should preferably have a valve-opening force sufficiently smaller than the biasing force of the return spring in the low-pressure reservoir 5 so as to allow the fluid in the low-pressure reservoir 5 to automatically flow back toward the master cylinder without the need of actuating the pump 6a when the brake pedal is released. The provision of a bypass line in parallel with the pump 6a and including a check valve adapted to be opened with a small pressure difference is another solution.

The provision of such a parallel check valve will make it possible to freely change the valve-opening force of the check valves 8-1 and 8-2.

If it is judged to be impractical from an economical viewpoint to sufficiently reduce the size of the clearance formed between the bore wall and the spool by reducing the manufacturing error, a solenoid valve may be provided at the discharge port 17 so as to keep the discharge port closed while the antilock control is inoperative and open it only during the antilock control.

A prior art brake system including an antilock device comprising two solenoid valves is usually provided with a check valve 8-3 as shown in FIG. 7 for connecting the input circuit and the output circuit together so that when the brake pedal is relaxed abruptly, the pressure in the brake 2 will fall automatically following the relaxation of the pedal before the electronic control unit 4 detects this. The provision of the fluid pressure controller 210 or 110 according to the present invention will make it possible to automatically reduce the braking pressure following the relaxation of the brake pedal without the need for the check valve 8-3. With the controller 210, the bypass channel 23 will open if the brake pedal is relaxed.

The brake system according to the present invention can be used as a traction controller simply by adding a device for forcibly increasing the pressure in the master cylinder or by providing a changeover valve between the pressure source and the master cylinder.

If the brake system has the function of introducing not only the hydrostatic pressure produced in the master cylinder but also the hydrodynamic pressure produced in the fluid pressure booster into the brake at least during the antilock control, the necessity will be eliminated for feeding the brake fluid back into the return line including the low-pressure reservoir by means of the pump. Thus the discharge port may be connected with the reservoir of the pump for the fluid pressure booster. The hydrodynamic pressure may be introduced into the brake even during the non-antilock control mode so as to reduce the leakage of brake fluid through the clearance between the housing and the spool to a negligibly low level. This will eliminate the necessity of inserting a solenoid valve in the discharge port 17 and of precisely machining the housing and the spool, thus making it possible to cut down the production cost.

What is claimed is:

1. A fluid pressure controller comprising a housing formed with a bore and an input port, a discharge port and an output port, a spool axially slidably mounted in said bore of the housing, a first chamber and a second chamber defined by the inner peripheral surface of said bore and both end faces of said spool, said spool being formed with an internal passage connecting said first and second chambers together and having its intermediate portion throttled to form a fixed-size orifice and with a peripheral channel disposed on the surface of said spool and communicating with said internal passage at a point between said first chamber and said fixed-size orifice, a spring for holding said spool in its initial position, and an electricity/power converter for imparting to said spool an axial driving force corresponding to the amplitude of an electric signal, said output port communicating with said second chamber, said spool being movable among a first position where said peripheral channel communicates with said input port, a second position where said peripheral channel communicates with neither said input port nor said discharge port and a third position where said peripheral channel communicates with said discharge port, so that when said output port is brought into communication with either said input port or said discharge port through said peripheral channel, hydraulic fluid will flow through said fixed-size orifice, thereby creating a pressure difference at both ends of said fixed-size orifice, a force acting on said spool by said pressure difference being equal to the driving force of said converter minus the biasing force of said spring.

2. A fluid pressure controller as claimed in claim 1, wherein said spool is adapted to be held in said second position by said spring while said electricity/power converter is deactivated, to be moved toward said first position if one of two different inputs (i.e. plus or minus) is applied to said electricity/power converter and to be moved toward said third position if the other input is applied to said converter.

3. A fluid pressure controller as claimed in claim 1, wherein said spool is adapted to be held in said first position by said spring while said electricity/power converter is deactivated, to be moved to said second position if an electric command of first level is applied to said converter and to be moved to said third position if an electric command of second level which is larger in amplitude than said first level is applied to said converter.

4. A fluid pressure controller as claimed in any of the claims 1 to 3, wherein said discharge port is not provided.

5. A fluid pressure controller as claimed in any of the claims 1 to 3, wherein said input port is not provided.

6. A fluid pressure controller as claimed in any of claims 1 to 3, wherein a bypass channel is formed in said housing or in both of said housing and said spool so as to bring said input port and said output port into direct communication with each other therethrough, when said spool is in a position toward said input port more than a predetermined distance from a transient point between said first position and said second position 7. A fluid pressure controller as claimed in any of claims 1 to 3, wherein a bypass channel for reducing fluid pressure is formed in said housing or in both of said housing and said spool so as to bring said discharge port and said output port into direct communication with each other therethrough, when said spool is in a position toward said discharge port more than a predetermined distance from a transient point between said second position and said third position.

8. A fluid pressure controller as claimed in claim 6, wherein said discharge port is not provided.

9. A fluid pressure controller as claimed in claim 7, wherein said discharge port is not provided.

10. A brake system for use in a motor vehicle, comprising:
a control means;
a static pressure generator for producing a static pressure in at least one brake line by manually operating said control means;
a dynamic pressure source having a reservoir;
an electronic control unit for producing a command to control the dynamic pressure so that the extent of manual operation on said control means and a deceleration of the vehicle will be in a predetermined relationship with each other; and
a fluid pressure controller having a housing formed with a bore and an input port connected to a static pressure line, a discharge port connected to the reservoir of said dynamic pressure source and an output port connected to said dynamic pressure source, a spool axially slidably mounted in said bore of the housing, a first chamber and a second chamber defined by the inner peripheral surface of said bore and both end faces of said spool, said spool being formed with an internal passage connecting said first and second chambers together and having its intermediate portion throttled to form a fixed-size orifice and with a peripheral channel disposed on the surface of said spool and communicating with said internal passage at a point between said first chamber and said fixed-size orifice, a spring for holding said spool in its initial position, and an electricity/power converter for imparting to said spool an axial driving force corresponding to the amplitude of an electric signal given by said electronic control unit, said output port communicating with said second chamber, said spool being movable among a first position where said peripheral channel communicates with said input port, a second position where said peripheral channel communicates with neither said input port nor said discharge port and a third position where said peripheral channel communicates with said discharge port, so that when said output port is brought into communication with either said input port or said discharge port through said peripheral channel, hydraulic fluid will flow through said fixed-size orifice, thereby creating a pressure difference at both ends of said fixed-size orifice, a force acting on said spool caused by said pressure difference being equal to the driving force of said converter minus the biasing force of said spring; the pressure in the static pressure line being controlled by changing over the communication of said output port with either said input port or said discharge port.

11. A brake system for use in a motor vehicle, comprising a fluid pressure controller having a housing formed with a bore and an input port, a discharge port and an output port, a spool axially slidably mounted in said bore of the housing, a first chamber and a second chamber defined by the inner peripheral surface of said bore and both end faces of said spool, said spool being formed with an internal passage connecting said first and second chambers together and having its intermediate portion throttled to form a fixed-size orifice and with a peripheral channel disposed on the surface of said spool and communicating with said internal passage at a point between said first chamber and said fixed-size orifice, a spring for holding said spool in its initial position, and an electricity/power converter for imparting to said spool an axial driving force corresponding to the amplitude of an electric signal, said output port communicating with said second chamber, said spool being movable among a first position where said peripheral channel communicates with said input port, a second position where said peripheral channel communicates with neither said input port nor said discharge port and a third position where said peripheral channel communicates with said discharge port, so that when said output port is brought into communication with either said input port or said discharge port through said peripheral channel, hydraulic fluid will flow through said fixed-size orifice, thereby creating a pressure difference at both ends of said fixed-size orifice, the force acting on said spool caused by said pressure difference being equal to the driving force of said converter minus the biasing force of said spring; said controller having said input port connected to a static pressure generator such as a master cylinder, said output port connected to a wheel brake, and said discharge port connected to a reservoir for temporarily storing brake fluid to be returned into an input of said static pressure generator by means of a pump.

12. A brake system for use in a motor vehicle, comprising a fluid pressure controller having a housing formed with a bore and an input port, a discharge port and an output port, a spool axially slidably mounted in said bore of the housing, a first chamber and a second chamber defined by the inner peripheral surface of said bore and both end faces of said spool, said spool being formed with an internal passage connecting said first and second chambers together and having its intermediate portion throttled to form a fixed-size orifice and with a peripheral channel disposed on the surface of said spool and communicating with said internal passage at a point between said first chamber and said fixed-size orifice, a spring for holding said spool in its initial position, and an electricity/power converter for imparting to said spool an axial driving force corresponding to the amplitude of an electric signal, said output port communicating with said second chamber, said spool being movable among a first position where said peripheral channel communicates with said input port, a second position where said peripheral channel communicates with neither said input port nor said discharge port and a third position where said peripheral channel communicates with said discharge port, so that when said output port is brought into communication with either said input port or said discharge port through said peripheral channel, hydraulic fluid will flow through said fixed-size orifice, thereby creating a pressure difference at both ends of said fixed-size orifice, the force acting on said spool caused by said pressure difference being equal to the driving force of said converter minus the biasing force of said spring; said controller having said input port connected to a dynamic pressure generator having a manual control means for control thereof, said output port connected to a wheel brake, and said discharge port connected to a reservoir of a dynamic pressure source which is pressurized by a pump for supplying hydraulic fluid to said dynamic pressure generator.

* * * * *